United States Patent
Biskeborn et al.

(10) Patent No.: US 9,280,991 B1
(45) Date of Patent: Mar. 8, 2016

(54) TMR HEAD DESIGN WITH INSULATIVE LAYERS FOR SHORTING MITIGATION

(71) Applicant: International Business Machines Corporation, Armonk, NY (US)

(72) Inventors: Robert G. Biskeborn, Hollister, CA (US); Robert E. Fontana, Jr., San Jose, CA (US); Jason Liang, Campbell, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/591,861

(22) Filed: Jan. 7, 2015

(51) Int. Cl.
*G11B 5/39* (2006.01)
*G11B 5/11* (2006.01)
*G11B 5/127* (2006.01)
*G11B 5/187* (2006.01)

(52) U.S. Cl.
CPC .. *G11B 5/39* (2013.01); *G11B 5/11* (2013.01); *G11B 5/1278* (2013.01); *G11B 5/187* (2013.01); *G11B 5/3909* (2013.01); *G11B 5/3912* (2013.01); *G11B 5/3932* (2013.01)

(58) Field of Classification Search
CPC ...... G11B 5/39; G11B 5/3903; G11B 5/3912; G11B 5/3909; G11B 5/3932
USPC ......... 360/319, 324.1, 324.11, 324.12, 324.2, 360/320
See application file for complete search history.

(56) References Cited

U.S. PATENT DOCUMENTS

| | | | |
|---|---|---|---|
| 5,668,688 A | 9/1997 | Dykes et al. | |
| 5,862,022 A | 1/1999 | Noguchi et al. | |
| 5,898,547 A | 4/1999 | Fontana, Jr. et al. | |
| 5,898,548 A | 4/1999 | Dill et al. | |
| 6,185,080 B1 | 2/2001 | Gill | |
| 6,198,609 B1 * | 3/2001 | Barr et al. | 360/322 |
| 6,209,193 B1 | 4/2001 | Hsiao | |
| 6,353,518 B2 | 3/2002 | Pinarbasi | |
| 6,680,832 B2 | 1/2004 | Fontana, Jr. et al. | |
| 6,735,059 B2 | 5/2004 | Sato | |
| 6,762,912 B2 * | 7/2004 | Ma | 360/128 |
| 6,847,509 B2 | 1/2005 | Yoshikawa et al. | |

(Continued)

FOREIGN PATENT DOCUMENTS

JP  2006134388 A  5/2006

OTHER PUBLICATIONS

Non-Final Office Action from U.S. Appl. No. 14/534,098, dated Apr. 3, 2015.

(Continued)

*Primary Examiner* — Jefferson Evans
(74) *Attorney, Agent, or Firm* — Zilka-Kotab, PC

(57) ABSTRACT

An apparatus according to one embodiment includes a transducer structure having: a lower shield having recesses in an upper surface thereof; an upper shield formed above the lower shield; a current-perpendicular-to-plane sensor between the upper and lower shields, the recesses being positioned on opposite sides of the sensor; and a first insulating layer in the recesses in the upper surface of the lower shield. An apparatus according to another embodiment includes a transducer structure having: a lower shield; an upper shield formed above the lower shield, the upper shield having recesses in a lower surface thereof; a current-perpendicular-to-plane sensor between the upper and lower shields, the recesses being positioned on opposite sides of the sensor; and a first insulating layer in the recesses in the lower surface of the upper shield.

18 Claims, 9 Drawing Sheets

(56) References Cited

U.S. PATENT DOCUMENTS

| | | | |
|---|---|---|---|
| 6,980,403 B2 | 12/2005 | Hasegawa | |
| 7,031,119 B2 | 4/2006 | Watanabe et al. | |
| 7,057,864 B2 | 6/2006 | Gill | |
| 7,280,321 B2 * | 10/2007 | Watanabe et al. | 360/320 |
| 7,352,539 B2 | 4/2008 | Sato et al. | |
| 7,382,589 B2 | 6/2008 | Lin et al. | |
| 7,551,409 B2 | 6/2009 | Carey et al. | |
| 7,715,156 B2 | 5/2010 | Hirata et al. | |
| 7,933,100 B2 | 4/2011 | Nakabayashi et al. | |
| 8,335,056 B2 | 12/2012 | Balamane et al. | |
| 8,576,518 B1 | 11/2013 | Zeltser et al. | |
| 8,804,287 B2 | 8/2014 | Araki et al. | |
| 2004/0057162 A1 | 3/2004 | Gill | |
| 2004/0218313 A1 | 11/2004 | Suda | |
| 2006/0002022 A1 * | 1/2006 | Feldbaum | G11B 5/127 360/125.62 |
| 2007/0047146 A1 | 3/2007 | Biskeborn et al. | |
| 2008/0151438 A1 | 6/2008 | Tanaka et al. | |
| 2009/0040661 A1 | 2/2009 | Tanaka et al. | |
| 2011/0051291 A1 * | 3/2011 | Miyauchi et al. | 360/245.3 |
| 2011/0085261 A1 * | 4/2011 | Ito et al. | 360/75 |
| 2012/0063034 A1 | 3/2012 | Hsu et al. | |
| 2012/0281319 A1 * | 11/2012 | Singleton | G01R 33/093 360/319 |
| 2014/0022668 A1 * | 1/2014 | Takagishi et al. | 360/97.11 |

OTHER PUBLICATIONS

Biskeborn et al., U.S. Appl. No. 14/534,098, filed Nov. 5, 2014.
List of IBM Patents or Patent Applications Treated as Related.
Final Office Action from U.S. Appl. No. 14/534,098, dated Aug. 5, 2015.

* cited by examiner

US 9,280,991 B1

TMR HEAD DESIGN WITH INSULATIVE LAYERS FOR SHORTING MITIGATION

BACKGROUND

The present invention relates to data storage systems, and more particularly, this invention relates to insulating layers in a tunneling magnetoresistance (TMR) head that mitigate shorting.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

BRIEF SUMMARY

An apparatus according to one embodiment includes a transducer structure having: a lower shield having recesses in an upper surface thereof; an upper shield formed above the lower shield; a current-perpendicular-to-plane sensor between the upper and lower shields, the recesses being positioned on opposite sides of the sensor; and a first insulating layer in the recesses in the upper surface of the lower shield.

An apparatus according to another embodiment includes a transducer structure having: a lower shield; an upper shield formed above the lower shield, the upper shield having recesses in a lower surface thereof; a current-perpendicular-to-plane sensor between the upper and lower shields, the recesses being positioned on opposite sides of the sensor; and a first insulating layer in the recesses in the lower surface of the upper shield.

An apparatus according to yet another embodiment includes a transducer structure having: a lower shield; an upper shield formed above the lower shield; and a current-perpendicular-to-plane sensor between the upper and lower shields. A spacing in a track direction between the upper and lower shields at a location lateral to the sensor is greater than a spacing in the track direction between the upper and lower shields across the sensor.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a transducer structure having: a lower shield having recesses in an upper surface thereof; an upper shield formed above the lower shield; a current-perpendicular-to-plane sensor between the upper and lower shields, the recesses being positioned on opposite sides of the sensor; and a first insulating layer in the recesses in the upper surface of the lower shield.

In another general embodiment, an apparatus according to another embodiment includes a transducer structure having: a lower shield; an upper shield formed above the lower shield, the upper shield having recesses in a lower surface thereof; a current-perpendicular-to-plane sensor between the upper and lower shields, the recesses being positioned on opposite sides of the sensor; and a first insulating layer in the recesses in the lower surface of the upper shield.

In yet another general embodiment, an apparatus according to yet another embodiment includes a transducer structure having: a lower shield; an upper shield formed above the lower shield; and a current-perpendicular-to-plane sensor between the upper and lower shields. A spacing in a track direction between the upper and lower shields at a location lateral to the sensor is greater than a spacing in the track direction between the upper and lower shields across the sensor.

Figure 1A:
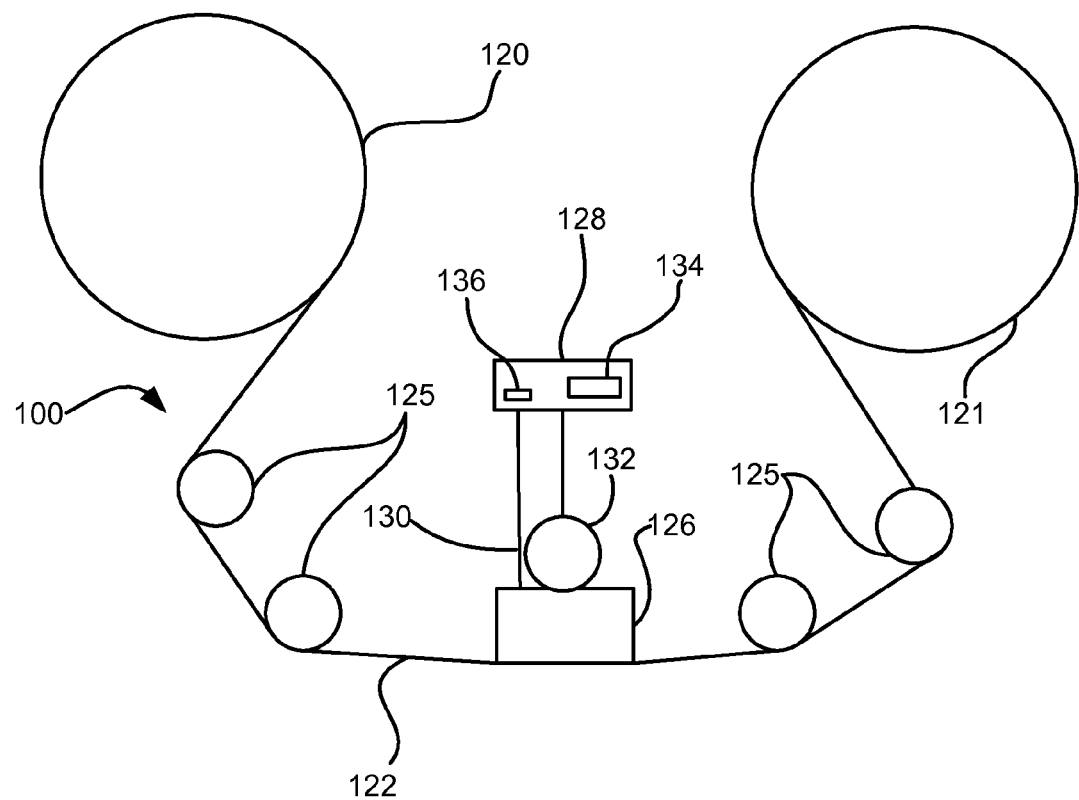
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
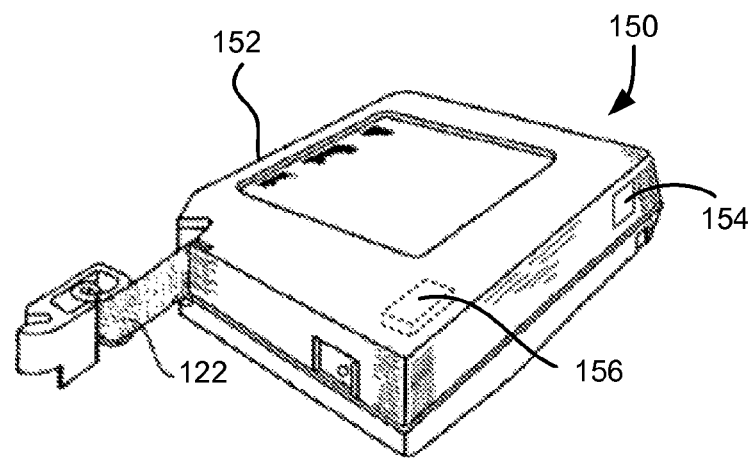
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some embodiments, the nonvolatile memory 156 may be embedded inside the housing 152, as shown in FIG. 1B. In more embodiments, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
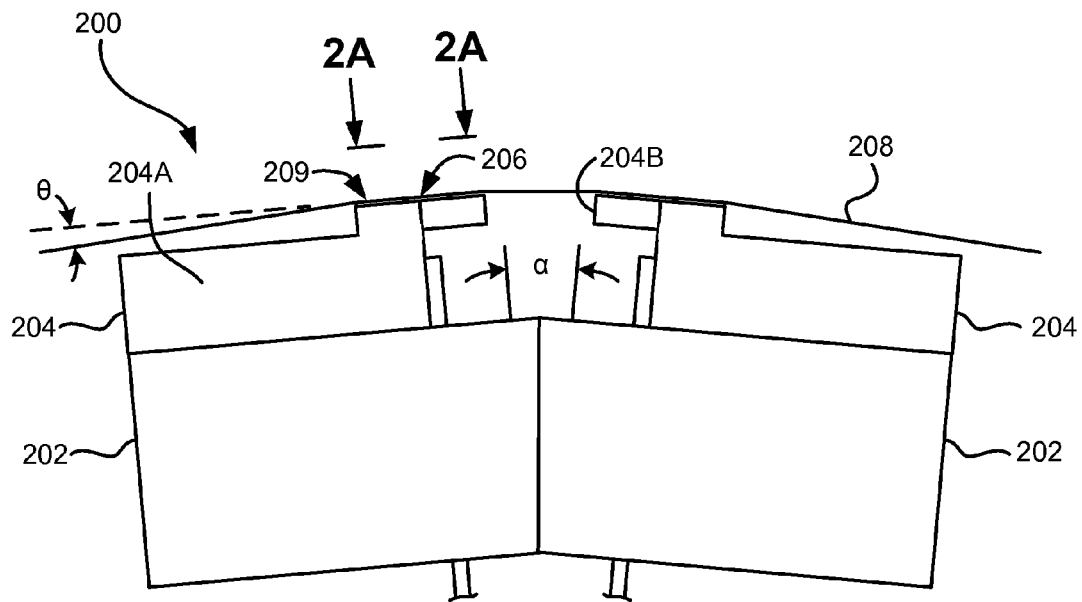
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
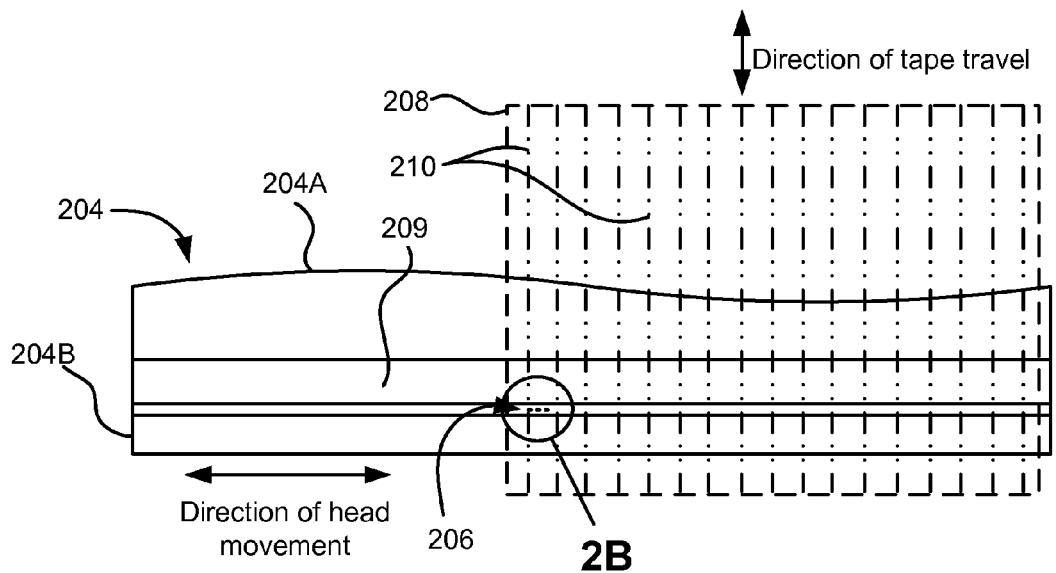
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
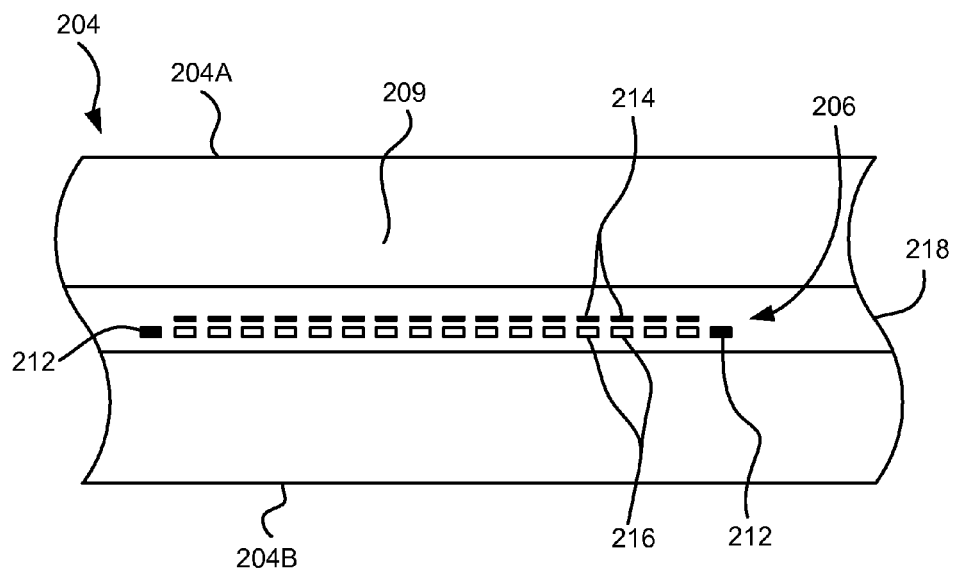
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
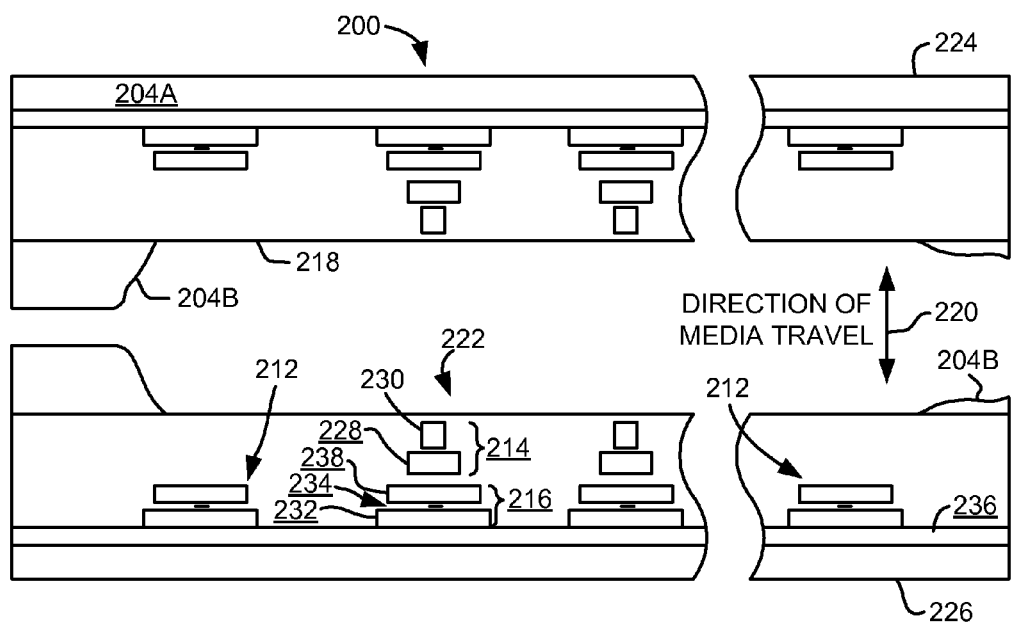
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, TMR, etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
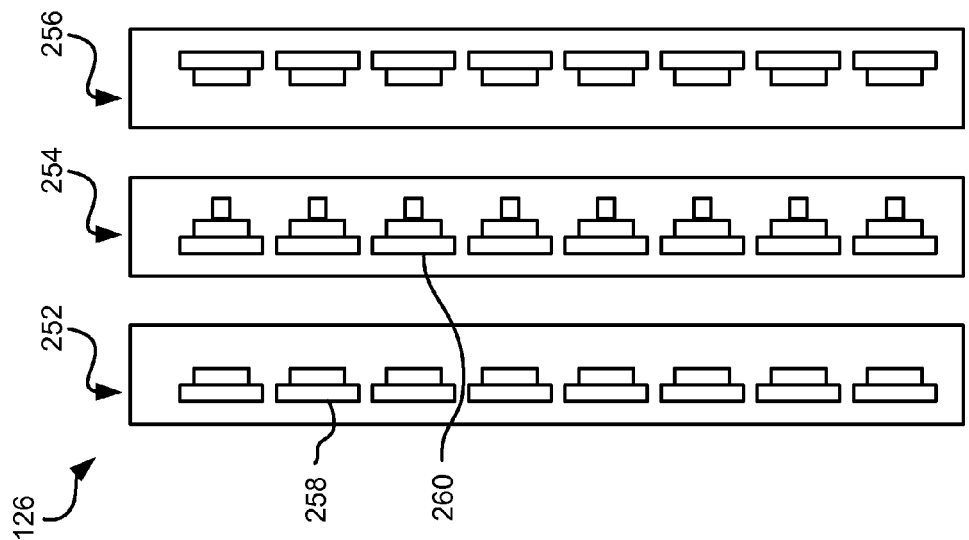
FIG. 4 is a partial tape bearing surface view of a magnetic head having a read-write-read configuration.
Figure 3:
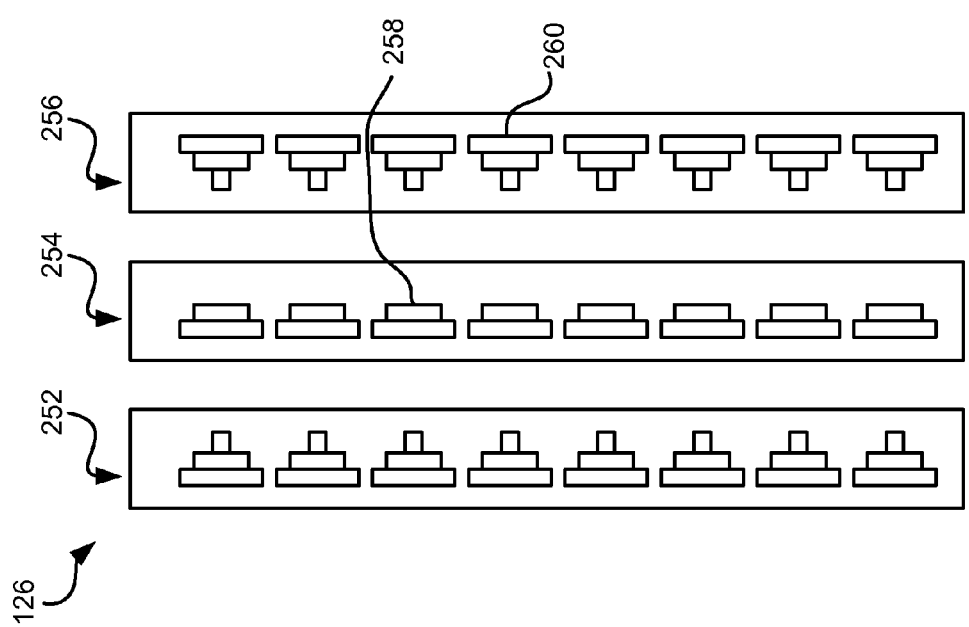
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further embodiments, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
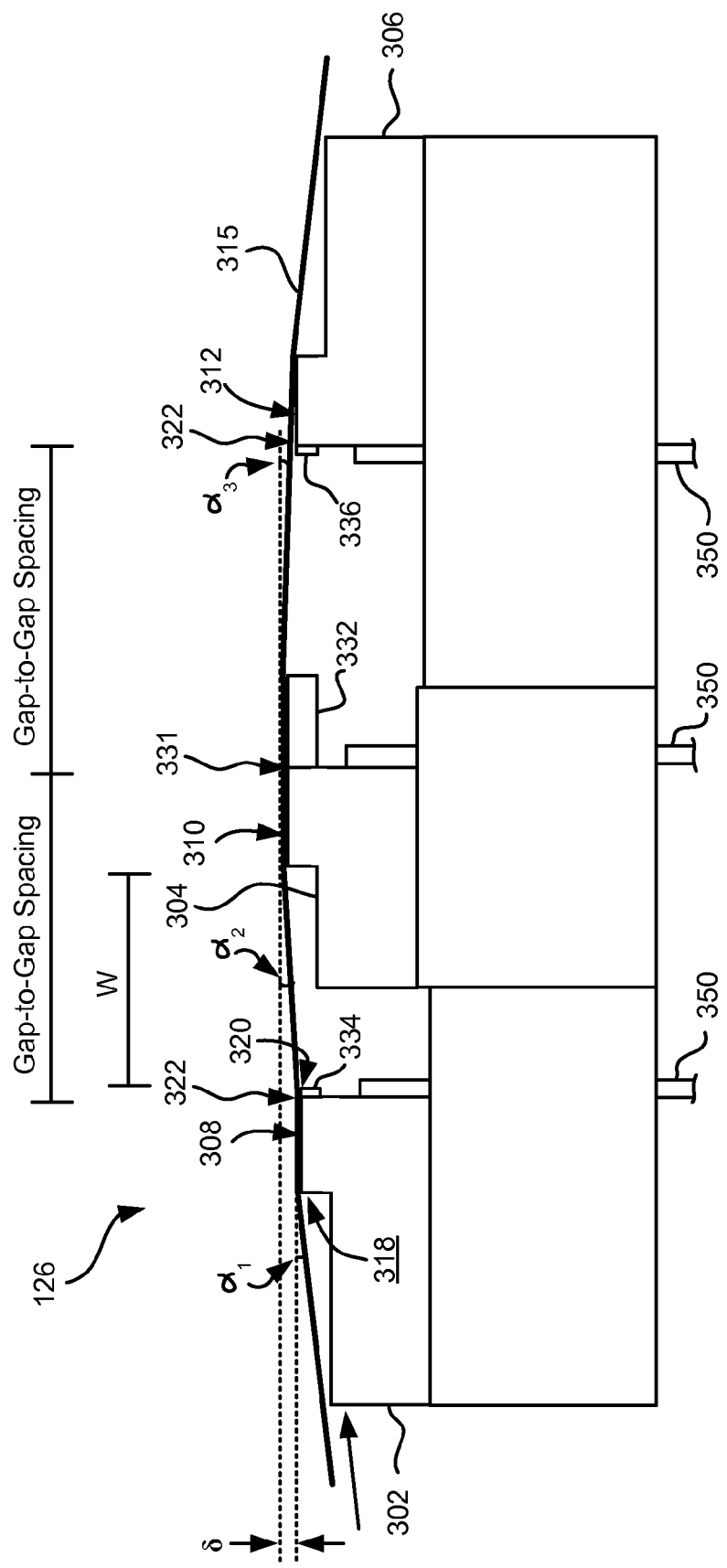
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
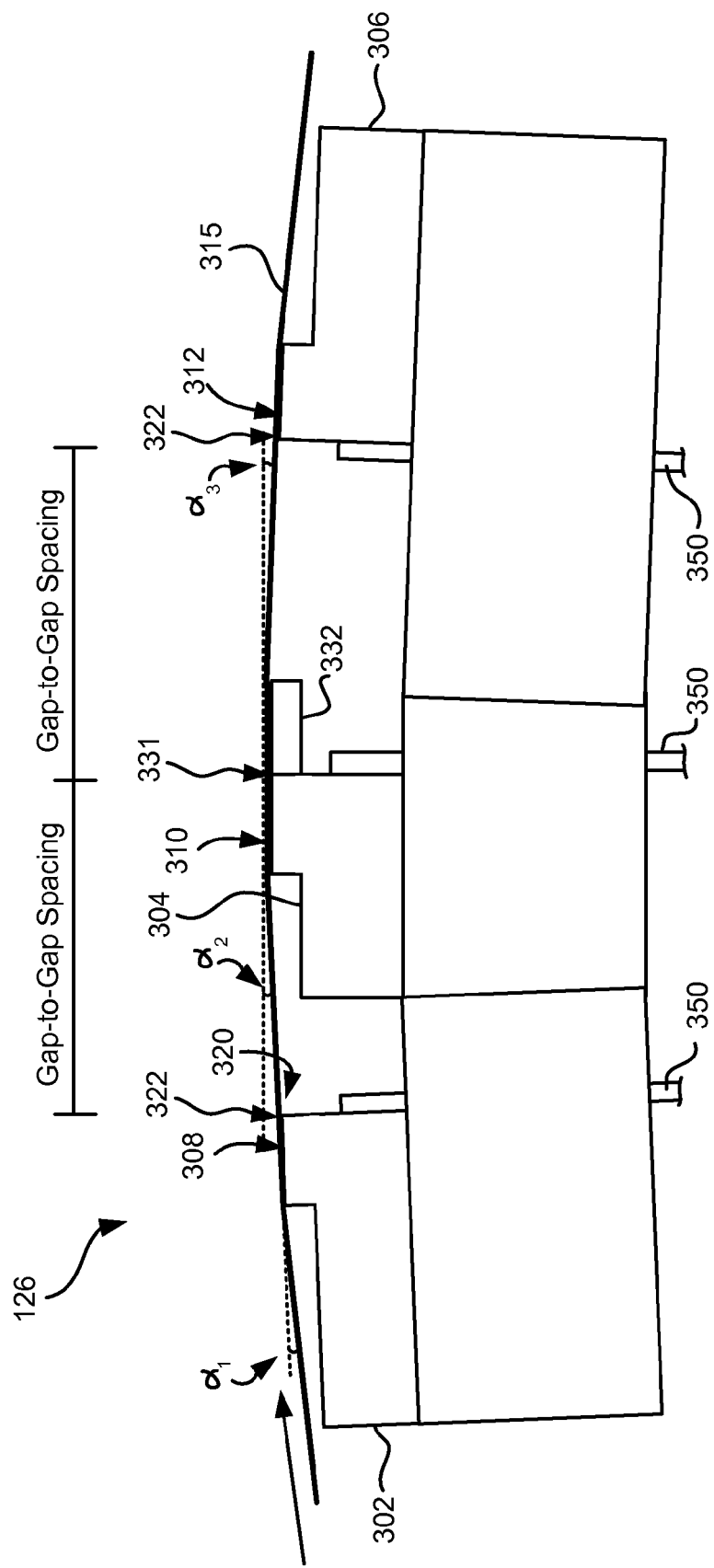
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
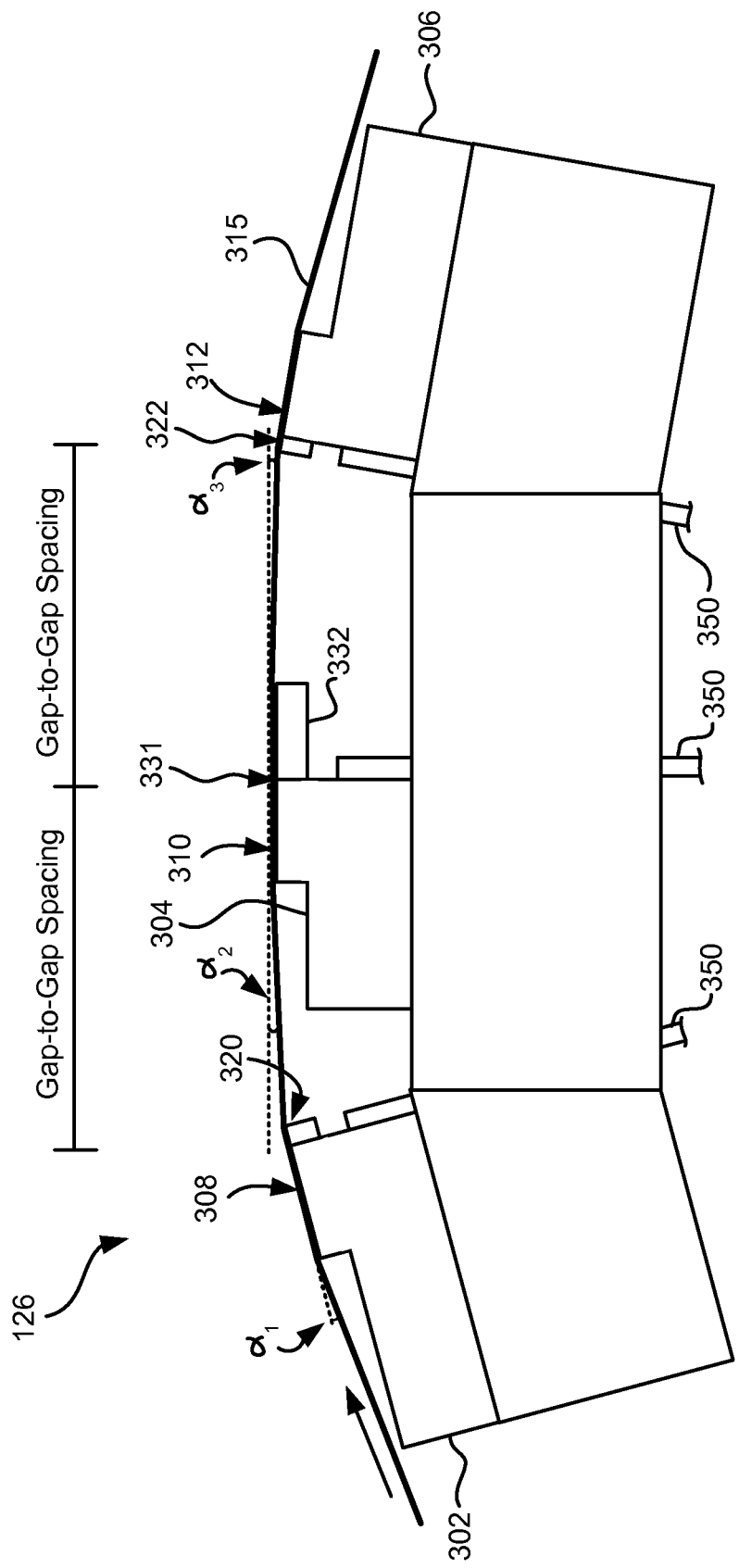
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other embodiments, the modules may be constructed as a unitary body. Those skilled in the art, armed with the present teachings, will appreciate that other known methods of manufacturing such heads may be adapted for use in constructing such heads.

With continued reference to the above described apparatuses, it would be advantageous for tape recording heads to include TMR sensor technology. Furthermore, with the continual decrease in data track width in magnetic storage technologies, TMR sensors enable readback of data in ultra-thin data tracks due to their high level of sensitivity in such small operating environments.

As will be appreciated by one skilled in the art, TMR is a magnetoresistive effect that occurs with a magnetic tunnel junction. TMR sensors typically include two ferromagnetic layers separated by a thin insulating layer. If the insulating layer is thin enough e.g., less than about 15 angstroms, electrons can tunnel from one ferromagnetic layer to the other ferromagnetic layer, passing through the insulating material and thereby creating a current. Variations in the current, caused by the influence of external magnetic fields from a magnetic medium on the free ferromagnetic layer of the TMR sensor, correspond to data stored on the magnetic medium.

It is well known that TMR sensors are very susceptible to shorting during fabrication due to abrasive lapping particles that scratch/smear conductive material across the insulating layer, thereby creating a short. Particularly, the lapping particles tend to plow through the ductile magnetic layer, e.g., leading shield, smearing the metal across the insulating layer, and thereby creating an electrical short that diminishes the sensitivity of the sensor.

By analogy, scientists and engineers familiar with tape recording technology would not expect a TMR sensor to remain operable (e.g., by not experiencing shorting) in a contact recording environment such as tape data storage, because of the near certain probability that abrasive asperities embedded in the recording medium will scrape across the thin insulating layer during tape travel, thereby creating the aforementioned shorting.

This problem is compounded in that the TMR sensors in a tape head are operating in an apparatus in which every one of the TMR sensors is required to be simultaneously fully functional for operation to design specifications.

In disk drives, conventional TMR designs are acceptable because there is minimal contact between the head and the media. However, for tape recording, the head and the media are in constant contact. Head coating e.g. with a MgO barrier layer, etc. has been cited as a possible solution to these shorting issues; however tape particles and asperities have been known to scratch through and/or wear away these coating materials. Furthermore, a head coating cannot protect against defects during the different lapping processes since the coating is applied after these process steps. Because the insulating layers of a conventional TMR sensor are so thin, the propensity for electrical shorting due to e.g. scratches, material deposits, surface defects, etc. is extremely high. Embodiments described herein implement novel insulating layers on a TMR sensor in order to prevent shorting in the most common areas where shorting has been observed, e.g. the relatively larger areas on opposite sides of the sensor between the shields.

Furthermore, the potential use of TMR sensors in tape heads has heretofore been thought to be highly undesirable, as tape heads include multiple sensors, e.g., 16, 32, 64, etc., on a single die. If one or more of those sensors become inoperable due to the aforementioned shorting, the head becomes defective and typically would need to be discarded and/or replaced for proper operation of the apparatus.

Conventional current in plane-type sensors require at least two shorting events across different parts of the sensor in order to affect the sensor output, and therefore such heads are far less susceptible to shorting due to scratches. In contrast, tape heads with TMR sensors may short with a single event, which is another reason that TMR sensors have not been adopted into contact recording systems.

Various embodiments described herein have enlarged insulating layer thicknesses that increase a distance between conductive layers, e.g., shields, thereby diminishing the probability that material, e.g., a smear caused by head-media contact, from one of the conductive layers will create a short.

Figure 8:
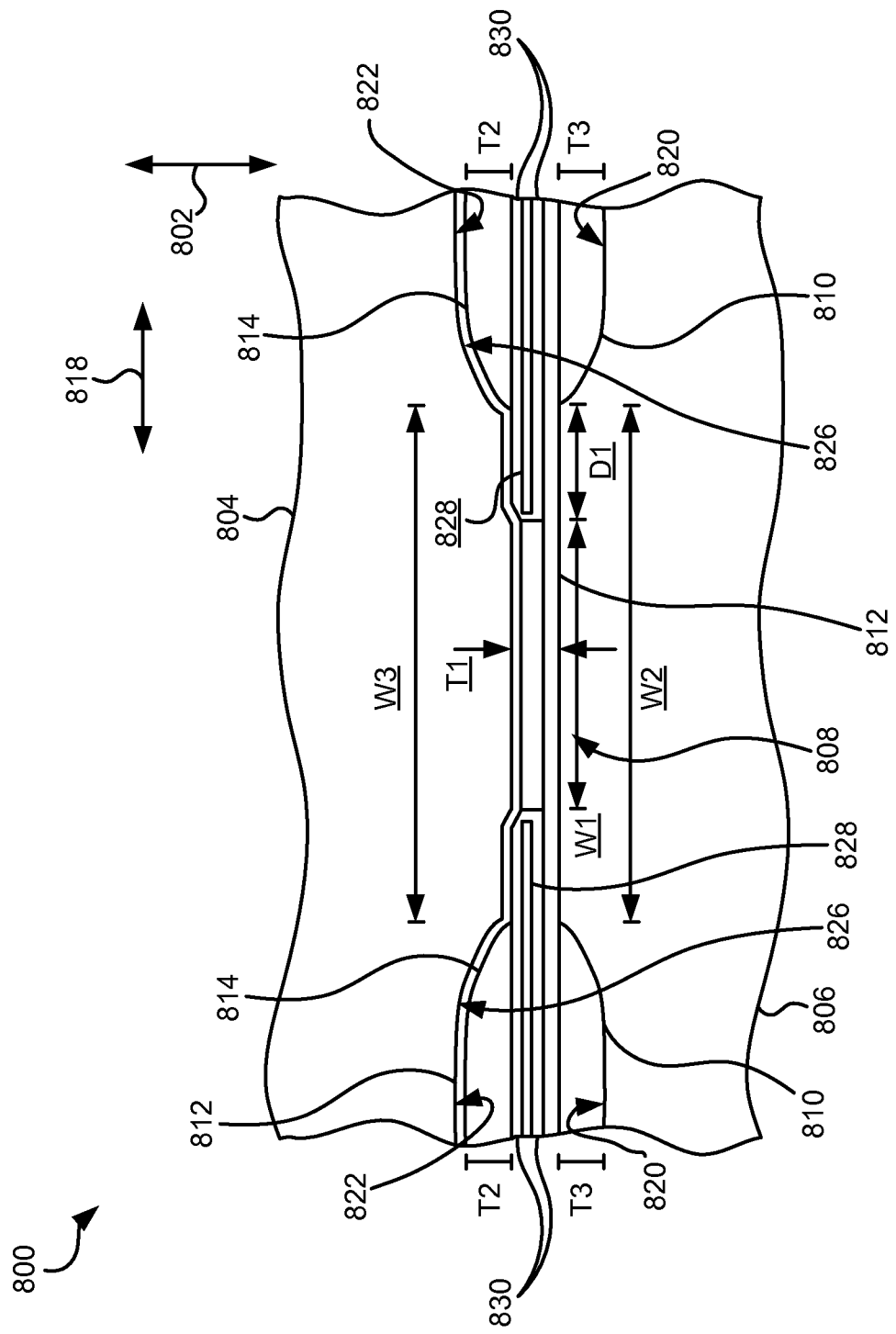
FIG. 8 is a side view of a transducer structure according to one embodiment.

FIG. 8 depicts a sensor transducer structure 800 in accordance with one embodiment. As an option, the present transducer structure 800 may be implemented in conjunction with features from any other embodiment listed herein, such as those described with reference to the other FIGS. Of course, however, such transducer structure 800 and others presented herein may be used in various applications and/or in permutations which may or may not be specifically described in the illustrative embodiments listed herein. Further, the transducer structure 800 presented herein may be used in any desired environment.

Referring now to FIG. 8, transducer structure 800 includes a current-perpendicular-to-plane sensor stack 808, such as a tunneling magnetoresistive (TMR) sensor, between an upper shield 804 and a lower shield 806. The upper shield 804 is formed above the lower shield 806. Electrical current flows into and out of the TMR sensor via leads, which may include the relatively large conductive shields 804 and 806.

Referring now to the lower portion of FIG. 8, the lower shield 806 has recesses 820 in an upper surface of the lower shield 806. The recesses 820 include lower insulating layers 810 positioned on opposite sides of the sensor stack 808 in a track width direction 818. Similarly, recesses 822 in a lower surface 826 of the upper shield 804 include upper insulating layers 814.

According to a preferred embodiment, a thickness T3 of the lower insulating layer 810 is greater than a spacing T1 between the upper and lower shields 804 and 806 at the sensor stack 808 in a track direction 802, but could vary depending on the embodiment. Likewise, a thickness T2 of the upper insulating layer 814 is greater than a spacing T1 between the upper and lower shields 804, 806 at the sensor stack 808 in a track direction 802, but could vary depending on the embodiment.

By maintaining a reduced shield to shield spacing T1 at the sensor region, the accuracy of the sensor is not compromised. Because the sensor width is very narrow e.g. typically less than two microns in the track width direction 818, which is substantially narrower when compared to the widths of the lower and upper insulating layers 810 and 814 (respectively) which extend in the track width direction 818, the potential for a shorting event at the sensor region is very small. Various contributions that the lower and upper insulating layers 810 and 814 (with thicknesses T3 and T2, respectively) provide in order to reduce these shorting issues will now be described below.

The lower and upper insulating layers 810 and 814 separate the conductive shields 804 and 806 in order to reduce the potential of, e.g., a scratch, redeposition, smear, etc. from bridging the two shields 804 and 806 and shorting the sensor. Additionally, according to one embodiment, the upper insulating layers 814 are deposited between the upper shield seed layer 812 and insulating layer 830 in the area away from the sensor stack 808 in order to maintain the shield-to-shield spacing T1 as described above.

The lower and upper insulating layers 810 and 814 each have a thickness of about 80-120 nanometers according to preferred embodiments, but could be thicker or thinner in other embodiments. The probability of a smearing event from plowing material of one shield to the other shield in a track direction 802 (which could ultimately short the sensor) is greatly decreased due to the thick insulative walls e.g. with thicknesses T2 and T3, each about 20-200 nanometers, preferably each about 80-120 nanometers. Note that thicknesses T2 and T3 may be, but need not be, identical. The sum of the thicknesses T2 and T3 ensures an at least 160 nanometer further separation between the conductive shields 804 and 806 than a conventional TMR sensor would include. Additionally, thicknesses T2 and T3 may be equal according to one embodiment, but could also be different according to another embodiment.

In order to maintain a total insulating layer thickness of at least 160 nanometers, e.g., when the upper insulating layers 814 are not enlarged away from the sensor stack 808, the lower insulating layers 810 may each have a thickness that is 160 nanometers. Likewise, when the lower insulating layers 810 are not enlarged away from the sensor stack 808, the upper insulating layers 814 may have a thickness that is at least 160 nanometers.

The insulating layers 810 and 814 described herein refer to electrical insulation in the transducer structure 800. According to various embodiments insulating layers 810 and 814 may be constructed of a metal oxide such as alumina, a polymer, or any other electrically insulating material known in the art.

Between the lower and upper insulating layers 810 and 814, transducer structure 800 includes biasing layers 828, e.g., of a magnetic material, for biasing the free layer of the sensor stack 808. Furthermore, the biasing layers 828 are positioned on opposite sides of the sensor stack 808 in a track width direction 818. Insulating layers 830 insulate the biasing layers 828 e.g. from the sensor stack 808, from the shields 804, 806, etc. with an electrically insulative material e.g. a metal oxide such as alumina, a polymer, or other insulative material known in the art, etc. The insulating layers 830 each typically have a thickness of about 5-9 nanometers, but could vary depending on the embodiment. According to some embodiments, the thickness of one or more of the insulating layers 830 may depend on material and/or processing compatibilities.

The dimensions of the biasing layers 828 and/or the insulating layers 830 at least partially surrounding the biasing layers 828 may vary depending on the embodiment. Also the spacing between the biasing layers 828 and sensor stack 808 may vary depending on design parameters. Preferably, the biasing layers 828 are electrically isolated from all other portions of the apparatus by an insulating material.

The inner most edges of the lower insulating layers 810 are separated by a distance W2 while the inner most edges of upper insulating layers 814 are separated by a distance W3. The outer edges of the sensor 808 have a width W1. It is advantageous to have the inner edges of the insulating layers 810 and 814 as close as possible to the outer edges of the sensor 808. This separation distance, i.e., W2−W1 or W3−W1 is preferably small, e.g., within a range between about 0.5 microns and about 10 microns, and more preferably less than about 2 microns. Preferably, the edges of the recesses 820 and/or 822 are within a distance D1 from the sensor edges in a range of between about 0.25 um and about 10 um, and most preferably between about 0.25 micron and about 1 micron. Note that widths W2 and W3 need not be identical.

Figure 9:
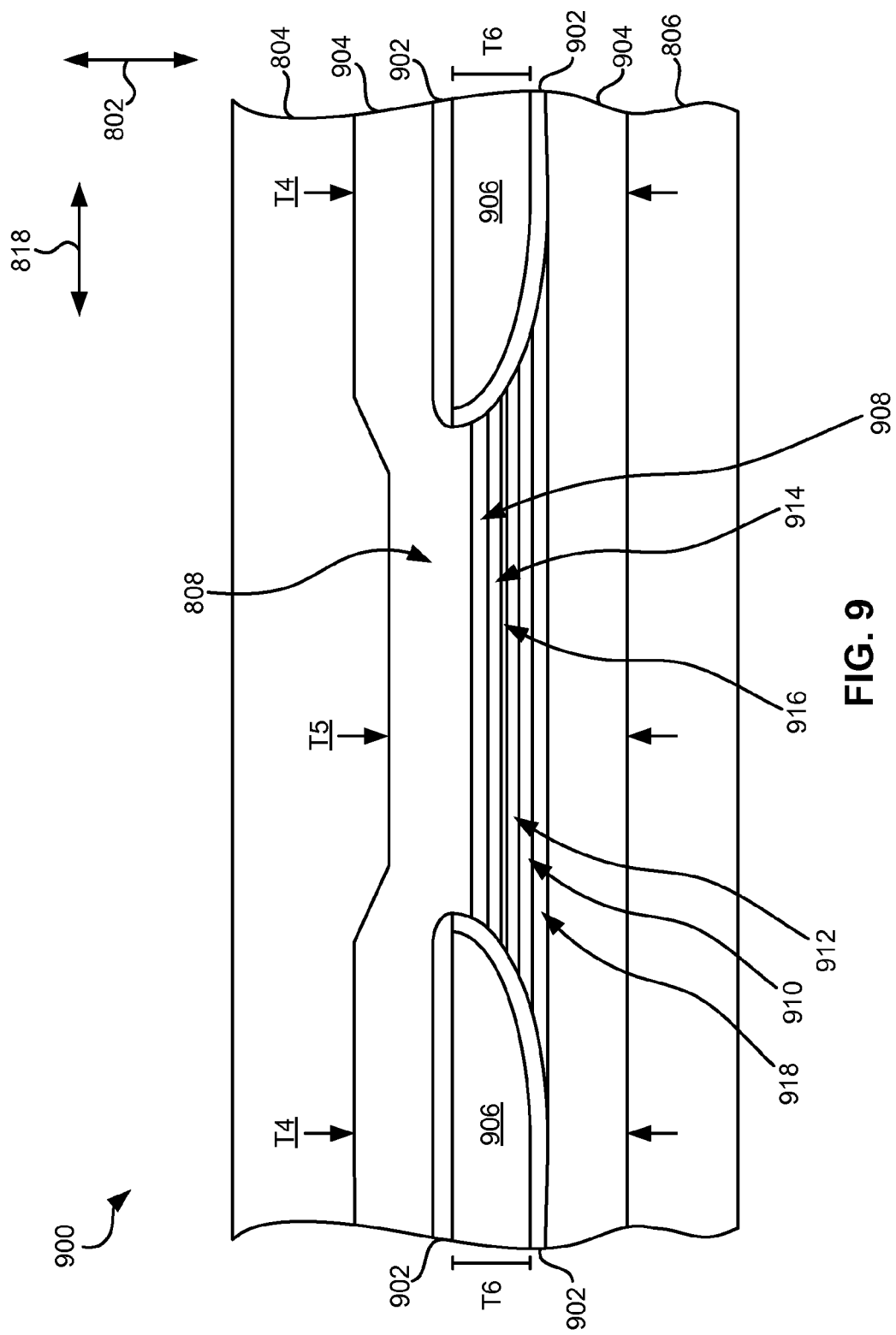
FIG. 9 is a side view of a transducer structure according to one embodiment.

FIG. 9 depicts transducer structure 900 in accordance with one embodiment. As an option, the present transducer structure 900 may be implemented in conjunction with features from any other embodiment listed herein, such as those described with reference to the other FIGS. Of course, however, such transducer structure 900 and others presented herein may be used in various applications and/or in permutations which may or may not be specifically described in the illustrative embodiments listed herein. Further, the transducer structure 900 presented herein may be used in any desired environment.

Referring now to FIG. 9, transducer structure 900 includes upper and lower shields 804 and 806, which may be similar to those in transducer structure 800 of FIG. 8. With continued reference to FIG. 9, spacer layers 904 are positioned between the upper and/or lower shields 804, 806 and the sensor stack 808, respectively. The spacer layers 904 may include any nonmagnetic material which would be apparent to one skilled in the art upon reading the present description, such as Ta, NiCr, etc. Additionally, transducer structure 900 includes biasing layers 906 between the lower insulating layers 902 and the upper shield 804. The biasing layers 906 are positioned on opposite sides of the sensor stack 808 in a track width direction 818. The sensor stack may have a known TMR design. The exemplary sensor stack 808 illustrated in FIG. 9 includes a free layer 914, a reference layer 912, a pinning layer 910, a seed layer 918, a tunnel barrier layer 916 and a cap layer 908.

Additionally, the biasing layers 906 are electrically isolated from some or all other portions of the apparatus by insulating layers 902. The thickness T6 of each biasing layer 906 may be at least about 80 nanometers, preferably at least 160 nanometers. The insulating layers 902 are an electrically insulating material, with a preferred thickness of about 5-9 nanometers, but could vary depending on the preferred embodiment.

The insulating layers 902, biasing layers 906 and spacer layers 904 together ensure that the spacing T4 in a track direction 802 between the upper and lower shields 804, 806 at a location lateral to the sensor stack 808 is greater than a spacing T5 in the track direction 802 between the upper and lower shields 804, 806 across the sensor stack 808.

As previously described, it is advantageous to have a shield to shield spacing away from the sensor stack 808 that is greater than the shield to shield spacing across the sensor stack. Furthermore, by maintaining a reduced shield to shield spacing T5 at the sensor stack, the accuracy of the sensor remains uncompromised.

It should be noted that although FIGS. 8 and 9 each illustrate a single transducer structure (transducer structure 800 and transducer structure 900), embodiments described herein include at least eight of the transducer structures above a common substrate, e.g., as shown in FIG. 2B. Furthermore, the number of transducer structures in a given array may vary depending on the preferred embodiment.

Various embodiments may be fabricated using known manufacturing techniques. Conventional materials may be used for the various layers unless otherwise specifically foreclosed. Furthermore, as described above, deposition thicknesses, configurations, etc. may vary depending on the embodiment.

It will be clear that the various features of the foregoing systems and/or methodologies may be combined in any way, creating a plurality of combinations from the descriptions presented above.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   a transducer structure having:
     a lower shield having recesses in an upper surface thereof;
     an upper shield formed above the lower shield;
     a current-perpendicular-to-plane sensor between the upper and lower shields, the recesses being positioned on opposite sides of the sensor; and
     a first insulating layer in the recesses in the upper surface of the lower shield,
     wherein a thickness of the first insulating layer is greater than a spacing between the upper and lower shields at the sensor in a track direction.

2. An apparatus as recited in claim 1, further comprising a second insulating layer in recesses in a lower surface of the upper shield.

3. An apparatus as recited in claim 2, further comprising a biasing layer between the first and second insulating layers, the biasing layer being positioned on opposite sides of the sensor in a track width direction.

4. An apparatus as recited in claim 1, wherein a thickness of the first insulating layer is greater than 100 nanometers.

5. An apparatus as recited in claim 1, further comprising a biasing layer between the first insulating layer and the upper shield, the biasing layer being positioned on opposite sides of the sensor in a track width direction, wherein the biasing layer is electrically isolated from all other portions of the apparatus by an insulating material.

6. An apparatus as recited in claim 1, wherein the sensor is a tunneling magnetoresistive sensor.

7. An apparatus as recited in claim 1, wherein at least eight of the transducer structures are present above a common substrate.

8. An apparatus as recited in claim 1, further comprising:
   a drive mechanism for passing a magnetic medium over the sensor; and
   a controller electrically coupled to the sensor.

9. An apparatus as recited in claim 8, wherein the magnetic medium is a magnetic recording tape.

10. An apparatus, comprising:
    a transducer structure having:
      a lower shield;
      an upper shield formed above the lower shield, the upper shield having recesses in a lower surface thereof;
      a current-perpendicular-to-plane sensor between the upper and lower shields, the recesses being positioned on opposite sides of the sensor; and
      a first insulating layer in the recesses in the lower surface of the upper shield,
      wherein a thickness of the first insulating layer is greater than a spacing between the upper and lower shields at the sensor in a track direction.

11. An apparatus as recited in claim 10, further comprising a second insulating layer in recesses in the upper surface of the lower shield, and a biasing layer between the first and second insulating layers, the biasing layer being positioned on opposite sides of the sensor in a track width direction.

12. An apparatus as recited in claim 11, wherein the biasing layer is electrically isolated from all other portions of the apparatus by an insulating material.

13. An apparatus as recited in claim 10, wherein a thickness of the first insulating layer is greater than 100 nanometers.

14. An apparatus as recited in claim 10, wherein the sensor is a tunneling magnetoresistive sensor.

15. An apparatus as recited in claim 10, wherein at least eight of the transducer structures are present above a common substrate.

16. An apparatus as recited in claim 10, further comprising:
    a drive mechanism for passing a magnetic medium over the sensor; and
    a controller electrically coupled to the sensor.

17. An apparatus as recited in claim 16, wherein the magnetic medium is a magnetic recording tape.

18. A tape apparatus, comprising:
    a magnetic recording tape;
    a transducer structure having: a lower shield; an upper shield formed above the lower shield; and a TMR sensor between the upper and lower shields, wherein the lower shield has recesses in an upper surface thereof and on opposite sides of the sensor and/or the upper shield has recesses in a lower surface thereof and on opposite sides of the sensor; and
    a first insulating layer in either the lower shield recesses or in the upper shield recesses;
    wherein a thickness of the first insulating layer is greater than a spacing between the upper and lower shields at the sensor in a track direction.

* * * * *